(12) United States Patent
Honda et al.

(10) Patent No.: US 7,267,204 B2
(45) Date of Patent: Sep. 11, 2007

(54) PAD REMAINING AMOUNT CHECKING STRUCTURE IN DISK BRAKE OF VEHICLE

(75) Inventors: Yoshinobu Honda, Saitama (JP); Hirokatsu Nakaie, Saitama (JP); Kenichi Fujii, Nagano (JP)

(73) Assignees: Honda Motor Co., Ltd., Tokyo (JP); Nissin Kogyo Co., Ltd., Nagano (JP)

( * ) Notice: Subject to any disclaimer, the term of this patent is extended or adjusted under 35 U.S.C. 154(b) by 193 days.

(21) Appl. No.: 11/063,732

(22) Filed: Feb. 24, 2005

(65) Prior Publication Data

US 2005/0217947 A1   Oct. 6, 2005

(30) Foreign Application Priority Data

Feb. 25, 2004   (JP)   ............... 2004-050180

(51) Int. Cl.
*F16D 66/02* (2006.01)
(52) U.S. Cl. ................................. 188/1.11 W
(58) Field of Classification Search ........... 188/1.11 R, 188/1.11 W; 180/218, 219, 227; 116/208
See application file for complete search history.

(56) References Cited

U.S. PATENT DOCUMENTS

| | | |
|---|---|---|
| 4,162,721 A | 7/1979 | Moriya |
| 4,241,327 A * | 12/1980 | Yamamoto ............ 188/1.11 W |
| 5,261,508 A * | 11/1993 | Kikuchi ................ 188/1.11 W |
| 5,819,886 A * | 10/1998 | Null ........................ 188/73.41 |

FOREIGN PATENT DOCUMENTS

| | | |
|---|---|---|
| JP | 52-61676 | 5/1977 |
| JP | 58-57531 | 4/1983 |
| JP | 2001-97269 | 4/2001 |
| JP | 2001-97269 A1 | 4/2001 |

* cited by examiner

*Primary Examiner*—Thomas J. Williams
(74) *Attorney, Agent, or Firm*—Arent Fox, LLP.

(57) ABSTRACT

In a disk brake of a vehicle, a caliper device which supports pads that can be pressed against a brake disk rotating with a wheel and which exerts a force to press the pads against the brake disk, is supported on a support member that supports an axle of the wheel. A recess that allows an entire thickness of the pad to be always visually identified from outside, is provided in a portion of a member that constitutes the caliper device, the portion covering the pad from outside. Thus, a degree of freedom in positioning of the caliper device is increased in checking a remaining amount of a pad.

2 Claims, 8 Drawing Sheets

PAD REMAINING AMOUNT CHECKING STRUCTURE IN DISK BRAKE OF VEHICLE

RELATED APPLICATION DATA

The Japanese priority application No. 2004-50180 upon which the present application is based is hereby incorporated in its entirety herein by reference.

BACKGROUND OF THE INVENTION

1. Field of the Invention

The present invention relates to a disk brake of a vehicle in which a caliper device that supports a pad that can be pressed against a brake disk rotating with a wheel and exerts a force to press the pad against the brake disk is supported on a support member that supports an axle of the wheel, and more particularly to an improved structure for checking a remaining amount of the pad.

2. Description of the Related Art

In a conventional rear wheel disk brake of vehicles such as motorcycles, a caliper device is often placed in a position where a remaining amount of a pad can be checked laterally from outside, which reduces a degree of freedom in positioning of the caliper device. In some rear disk brakes in which a caliper body is mounted to a swing arm that supports an axle of a rear wheel, a swing arm is bent outside to avoid a pad in order to allow a remaining amount of the pad to be checked from above (for example, see Japanese Patent Application Laid-open No. 2001-97269). In this case, a restriction is imposed on a shape of the swing arm, which requires specific machining and may increase the cost and weight.

SUMMARY OF THE INVENTION

The present invention has been achieved in view of the above-mentioned circumstances, and has an object to provide a pad remaining amount checking structure in a disk brake of a vehicle, capable of increasing a degree of freedom in positioning of a caliper device in checking a remaining amount of a pad.

In order to achieve the object, according to a first feature of the present invention, there is provided a pad remaining amount checking structure in a disk brake of a vehicle in which a caliper device that supports pads that can be pressed against a brake disk rotating with a wheel and exerts a force to press the pads against the brake disk is supported on a support member that supports an axle of the wheel, wherein a recess that allows an entire thickness of a pad to be always visually identified from outside is provided in a portion of a member that constitutes the caliper device, the portion covering the pad from outside.

In addition to the first feature, according to a second feature of the present invention, a swing arm that is a support member has an opening in substantially the center thereof and is placed on one side of a rear wheel so as to support the axle of the rear wheel at a rear end thereof, wherein the caliper device includes a caliper body to which a brake piston is slidably fitted and part of which is placed in the opening, and a bracket formed by connecting a pair of support portions that are spaced peripherally of the brake disk and that support the pads via a connecting portion placed between the brake disk and the swing arm, and is supported on the swing arm, and wherein the recess is provided in a side surface facing the brake disk of the connecting portion.

In addition to the second feature, according to a third feature of the present invention, a lower end of a rear cushion provided between the swing arm swingably supported on an engine provided on a body frame and the body frame is connected to the swing arm backward of the caliper device, and wherein the recess is provided in the connecting portion of the bracket in a position where the caliper device is visually identified between the rear wheel and the rear cushion when viewed diagonally from above the rear of the rear wheel.

With the first feature, the entire thickness of the pad can be always visually identified from the recess provided in the portion in the member that constitutes the caliper device, the portion covering the pad from outside, thereby increasing the degree of freedom in positioning of the caliper device and checking the remaining amount of the pad in the disk brake.

With the second feature, part of the caliper body is placed in the opening of the swing arm to prevent the caliper device from protruding from a vehicle body, and the recess is provided in the connecting portion placed between the swing arm and the brake disk in the bracket that constitutes part of the caliper device, thereby eliminating the need for specific machining of the swing arm, allowing the remaining amount of the pad to be checked using a small space, and reducing the cost and weight of the swing arm.

With the third feature, the remaining amount of the pad can be checked diagonally from above the rear of the rear wheel with a sufficient space, thereby facilitating the check.

DESCRIPTION OF THE PREFERRED EMBODIMENT

Now, an embodiment of the invention will be described with reference to the accompanying drawings.

Figure 1:
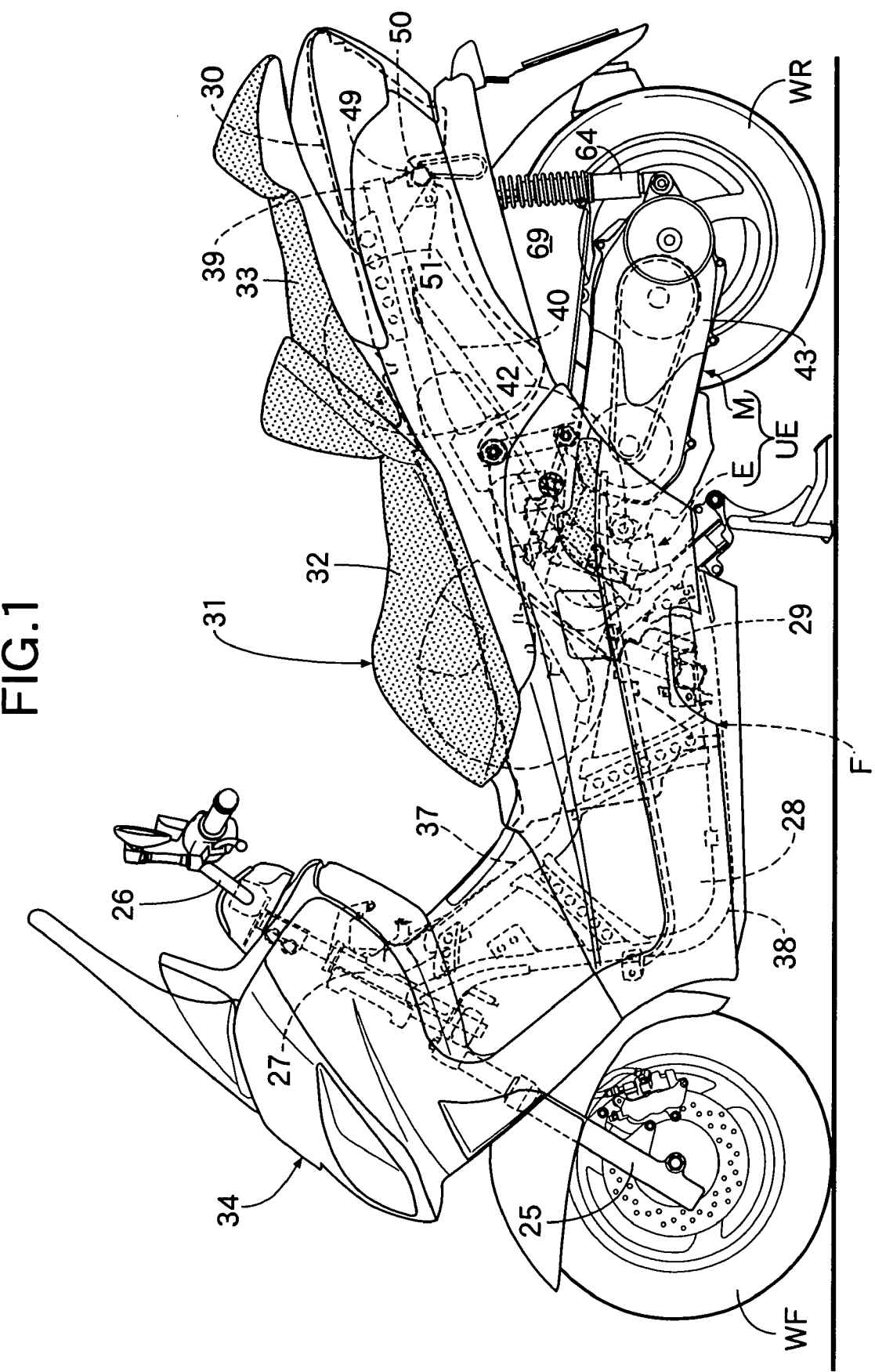
FIG. 1 is a left side view of a motor scooter type vehicle.

First in FIG. 1, a body frame F of a motor scooter type vehicle that is a motor cycle, includes: in a front end, a front fork 25 that supports a front wheel WF; and a head pipe 27 that steerably supports a steering wheel 26 connected to the front fork 25. A unit swing engine UE that supports a rear wheel WR at a rear end thereof is vertically swingably supported on an intermediate portion in a front-rear direction of the body frame F. A fuel tank 28 formed to be vertically long when laterally viewed, and a radiator 29 placed backward of the fuel tank 28 are provided on the body frame F forward of the unit swing engine UE. A housing box 30 is mounted to the body frame F so as to cover the unit swing engine UE from above. A riding seat 31 having a front seat 32 and a rear seat 33 and formed into a tandem shape is placed on the housing box 30. Further, a body cover 34 made of synthetic resin is mounted to the body frame F to cover the front of the unit swing engine UE, the fuel tank 28, the radiator 29, and the housing box 30.

The body frame F includes: the head pipe 27; a pair of right and left upper down frames 37 connected to the head pipe 27 and diagonally extending downward to the rear; a pair of right and left lower down frames 38 connected to the head pipe 27 at lower positions than the upper down frames 37 and welded at rear ends thereof to rear ends of the upper down frames 37; a pair of right and left seat rails 39 diagonally extending upward to the rear from intermediate portions of the upper down frames 37; and a pair of right and left rear frames 40 connecting the rears of the upper down frames 37 and the rears of the seat rails 39.

Figure 2:
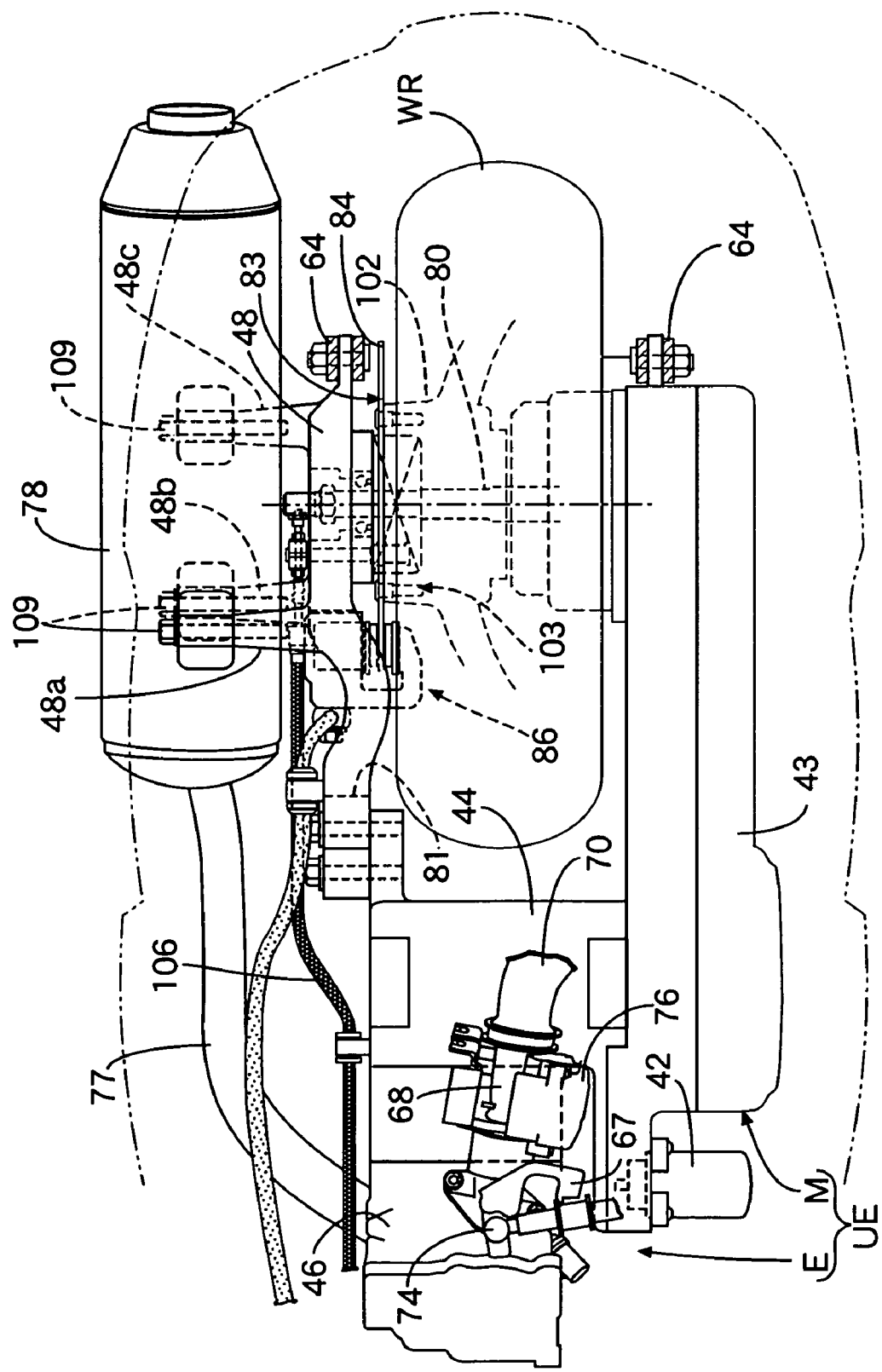
FIG. 2 shows relative placement of a unit swing engine and a rear wheel.
Figure 3:
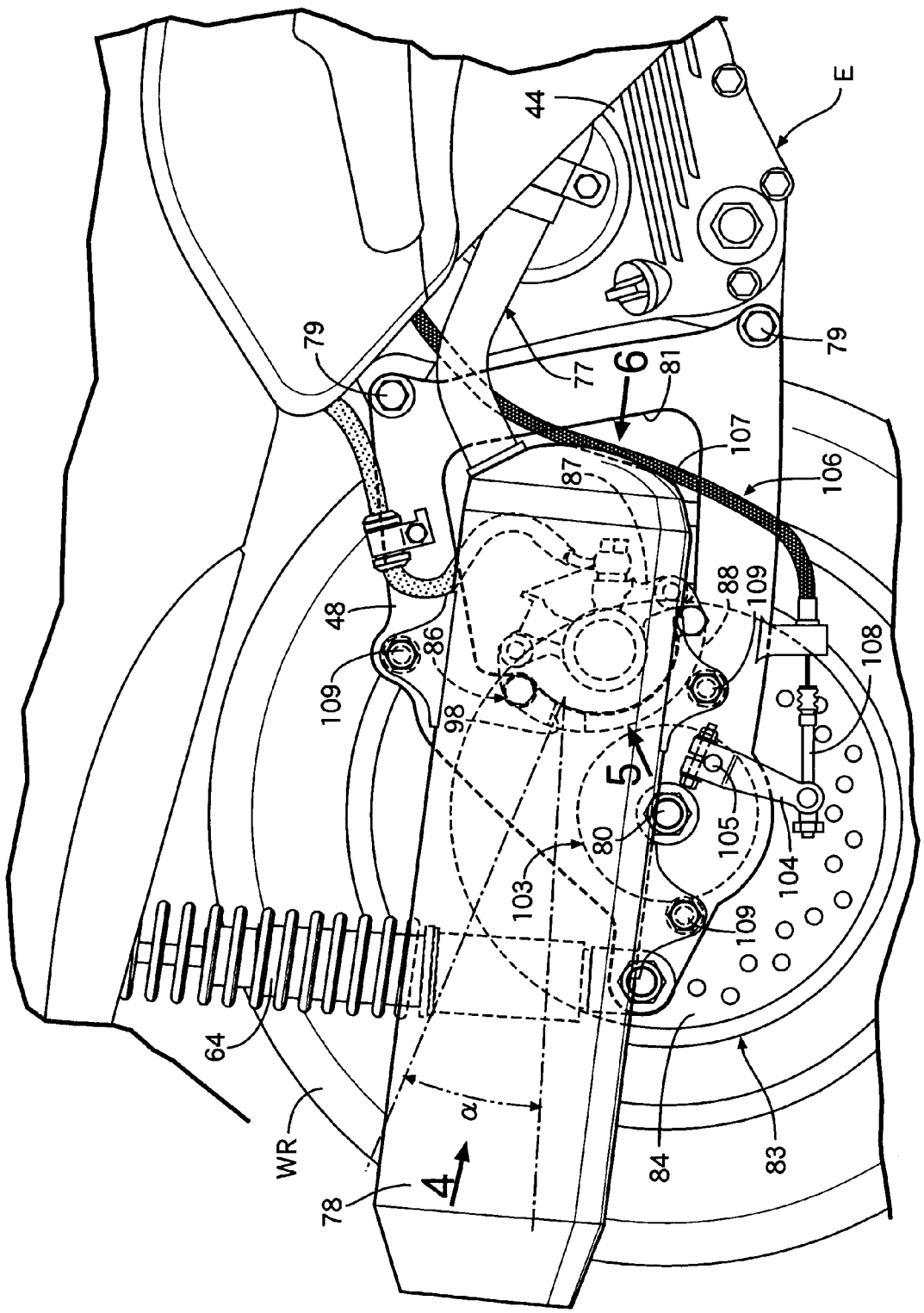
FIG. 3 is a rear right side view of the motor scooter type vehicle.

With reference to FIGS. 2 and 3 together, the unit swing engine UE is constituted by a water-cooled engine E with a substantially horizontal cylinder axis, and a belt-type continuously variable transmission M that continuously varies the speed of an output of the engine E and transmits the output to the rear wheel WR through a transmission belt and a pulley. The continuously variable transmission M drives a movable pulley on a crankshaft side according to actuation of a variable speed electric motor 42 to continuously vary a gear ratio.

A transmission case 43 of the continuously variable transmission M is connected to the left side of a crank case 44 in the engine E so as to overhang to the left from the engine E, and extends to the left side of the rear wheel WR. A front end of the swing arm 48 is connected to the right side of the crank case 44. The rear wheel WR is supported between a rear end of the transmission case 43 and a rear end of the swing arm 48.

Support plates 49 hanging downward are secured to rear ends of the seat rails 39 in the body frame F. Upper ends of rear cushions 64 are connected to a pair of brackets 51 provided on a support pipe 50 astride the support plates 49, and lower ends of the rear cushions 64 are connected to the rear end of the transmission case 43 and the rear end of the swing arm 48 that is a support member.

A downstream end of a throttle body 68 is connected to an upper surface of a cylinder head 46 in the engine E via an intake pipe 67 bent backward from the cylinder head 46. An upstream end of the throttle body 68 is connected to an air cleaner 69 (see FIG. 1) placed above the continuously variable transmission M in the unit swing engine UE.

A fuel injection valve 74 is mounted to the intake pipe 67. A control box 76 that houses a controller for controlling ignition timing of the engine E and a fuel injection amount of the fuel injection valve 74, is mounted to the throttle body 68.

An exhaust pipe 77 is connected to a lower surface of the cylinder head, and as shown in FIG. 2, the exhaust pipe 77 is connected to an exhaust muffler 78 placed on the right side of the swing arm 48.

The swing arm 48 has, in substantially the center thereof, an opening 81 formed so that a vertical width becomes smaller toward the rear, and is formed into a substantially triangular shape with a narrowing rear end when laterally viewed. The front of the swing arm 48 are fastened, at two upper and lower spots, to the crank case 44 of the engine E with bolts 79 and 79. An axle 80 of the rear wheel WR is supported at the rear of the swing arm 48. The lower end of the rear cushion 64 is connected to the rear end of the swing arm 48 backward of the axle 80.

Figure 4:
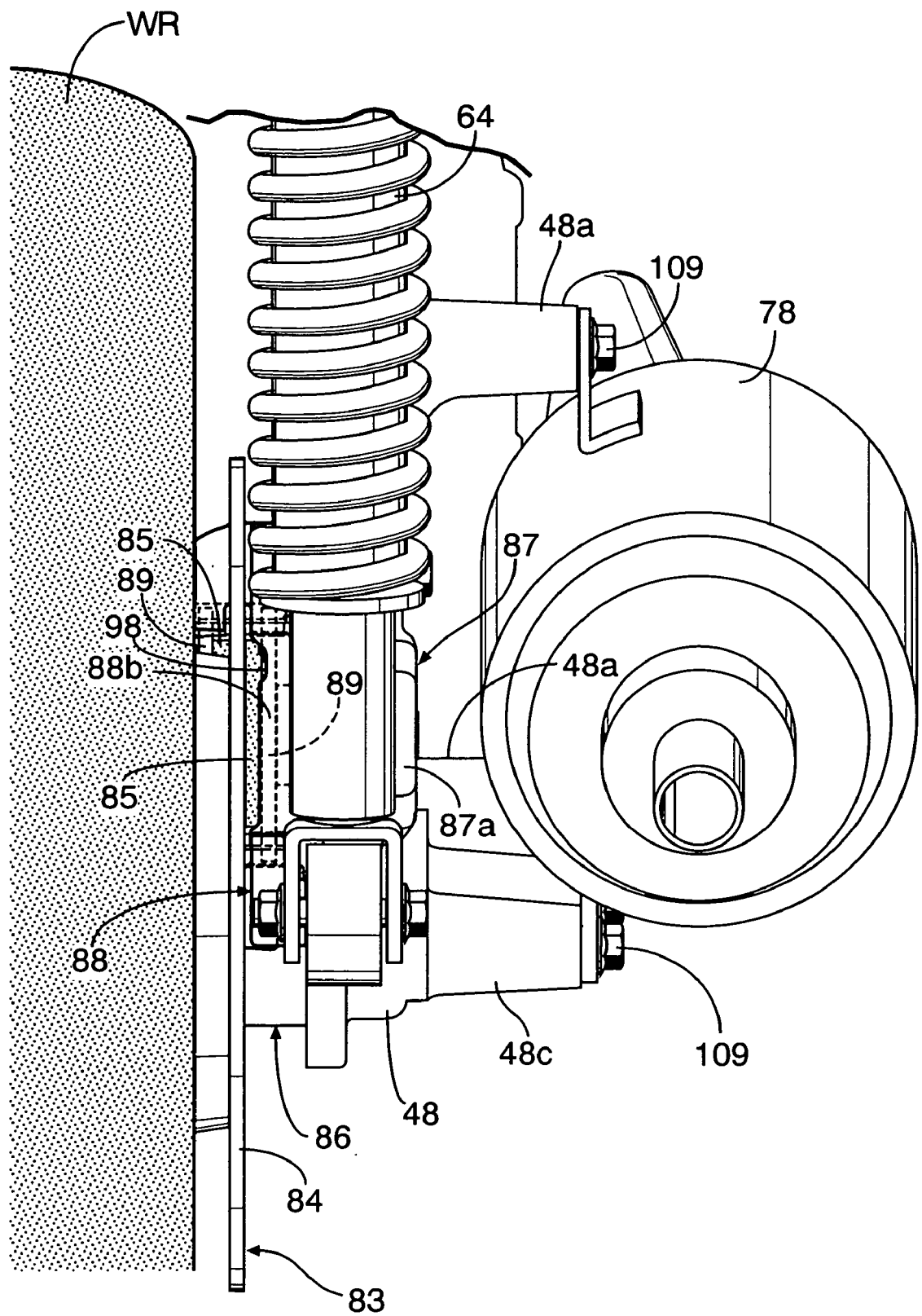
FIG. 4 is a view taken in the direction of arrow 4 of FIG. 3.
Figure 5:
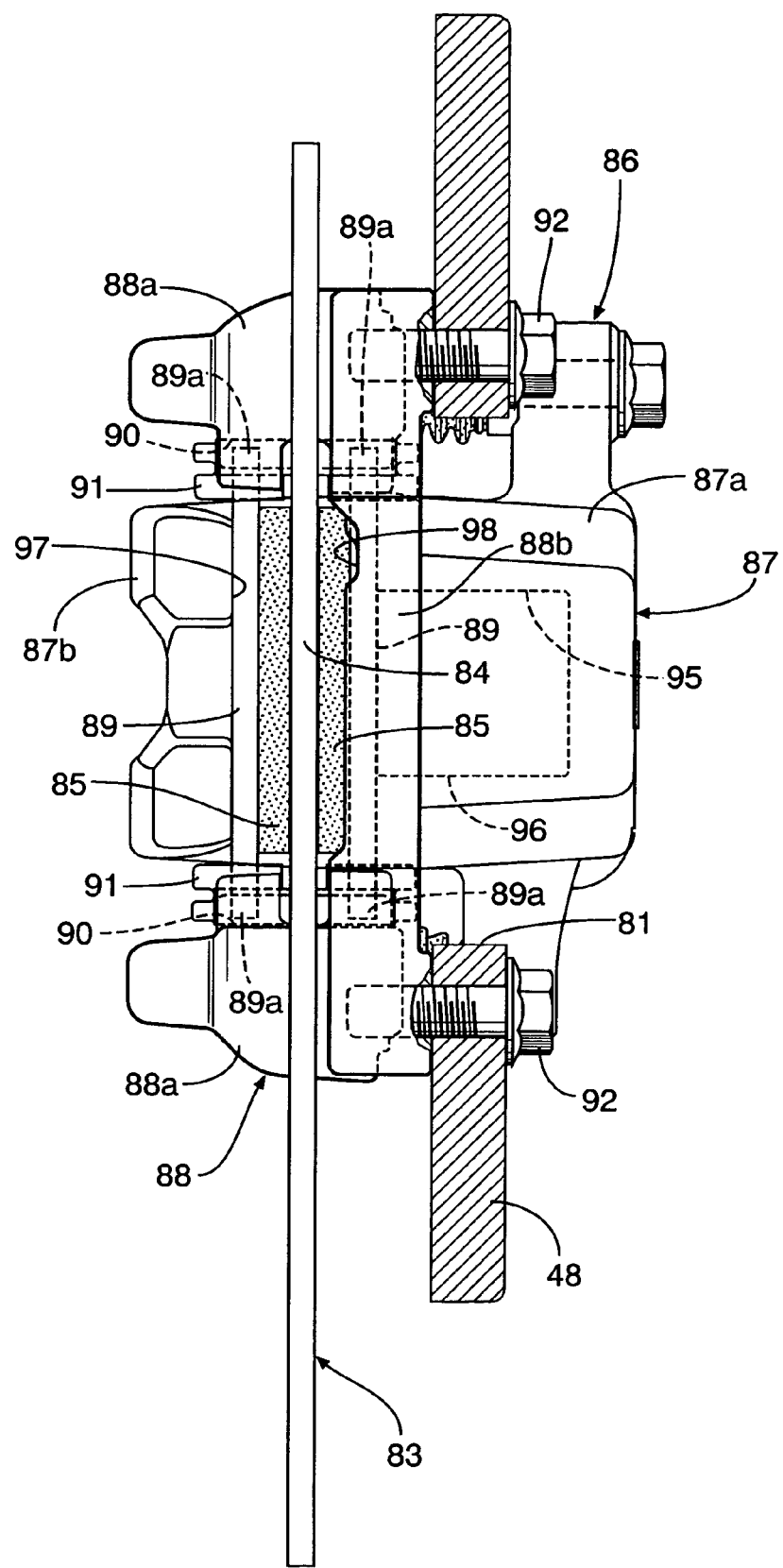
FIG. 5 is a view taken in the direction of arrow 5 of FIG. 3.
Figure 6:
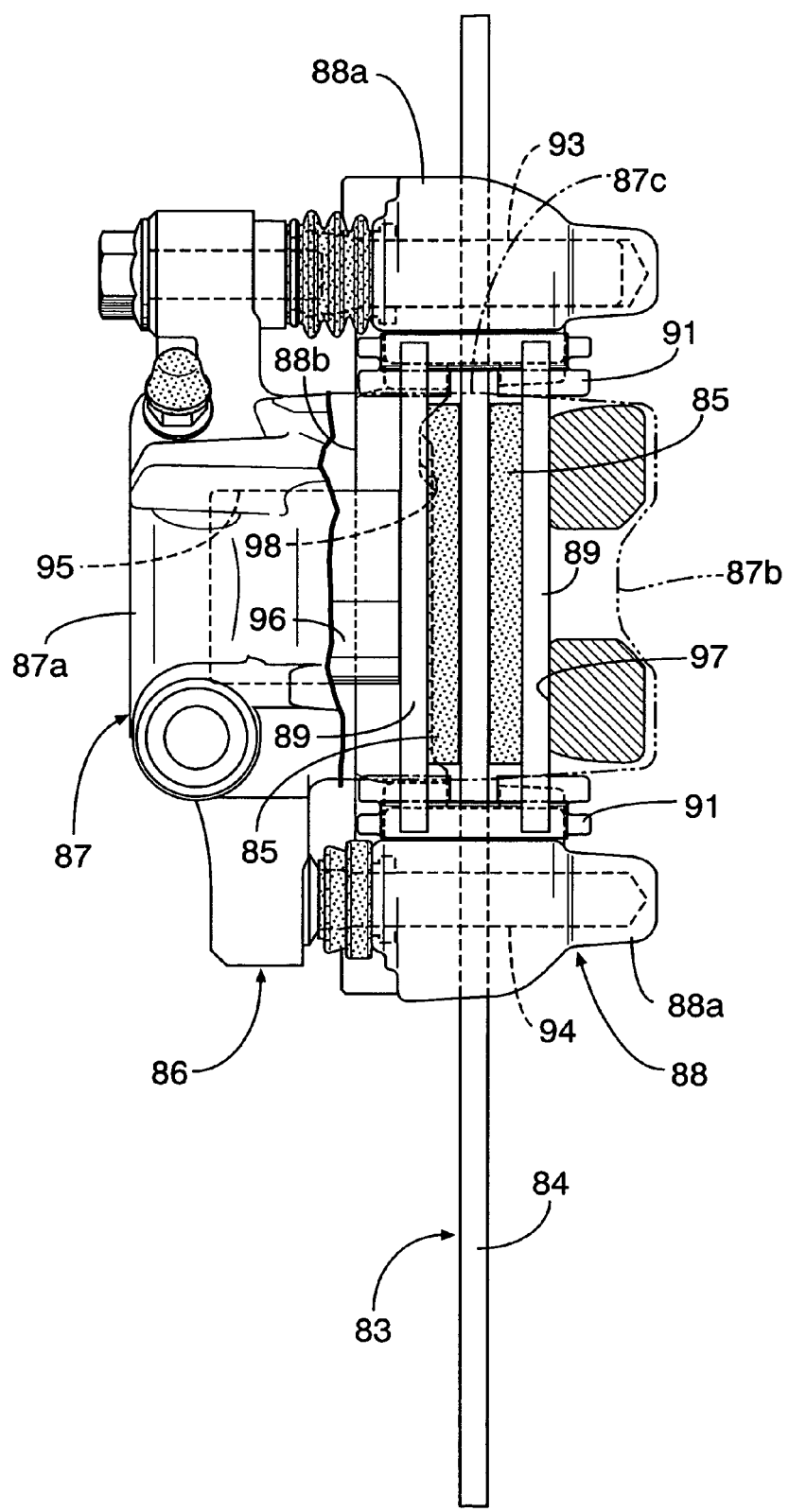
FIG. 6 is a view of a rear wheel disk brake taken in the direction of arrow 6 of FIG. 3.

With reference to FIGS. 4 to 6 together, a rear wheel disk brake 83 mounted to the rear wheel WR, includes: a brake disk 84 rotating with the rear wheel WR; a pair of pads 85 and 85 placed to face opposite surfaces of the brake disk 84; and a caliper device 86 that supports the pads 85 and 85 and exerts a force to press the pads 85 and 85 against the brake disk 84. The caliper device 86 is supported on the swing arm 48 that supports the axle 80 of the rear wheel WR.

The caliper device 86 includes: a caliper body 87 part of which is placed in the opening 81 of the swing arm 48; and a bracket 88 that supports the caliper body 87 slidably in a direction parallel to a rotational axis of the brake disk 84 and supports the pads 85 and 85 slidably in the direction parallel to the rotational axis of the brake disk 84, and that is secured to the swing arm 48.

Figure 7:
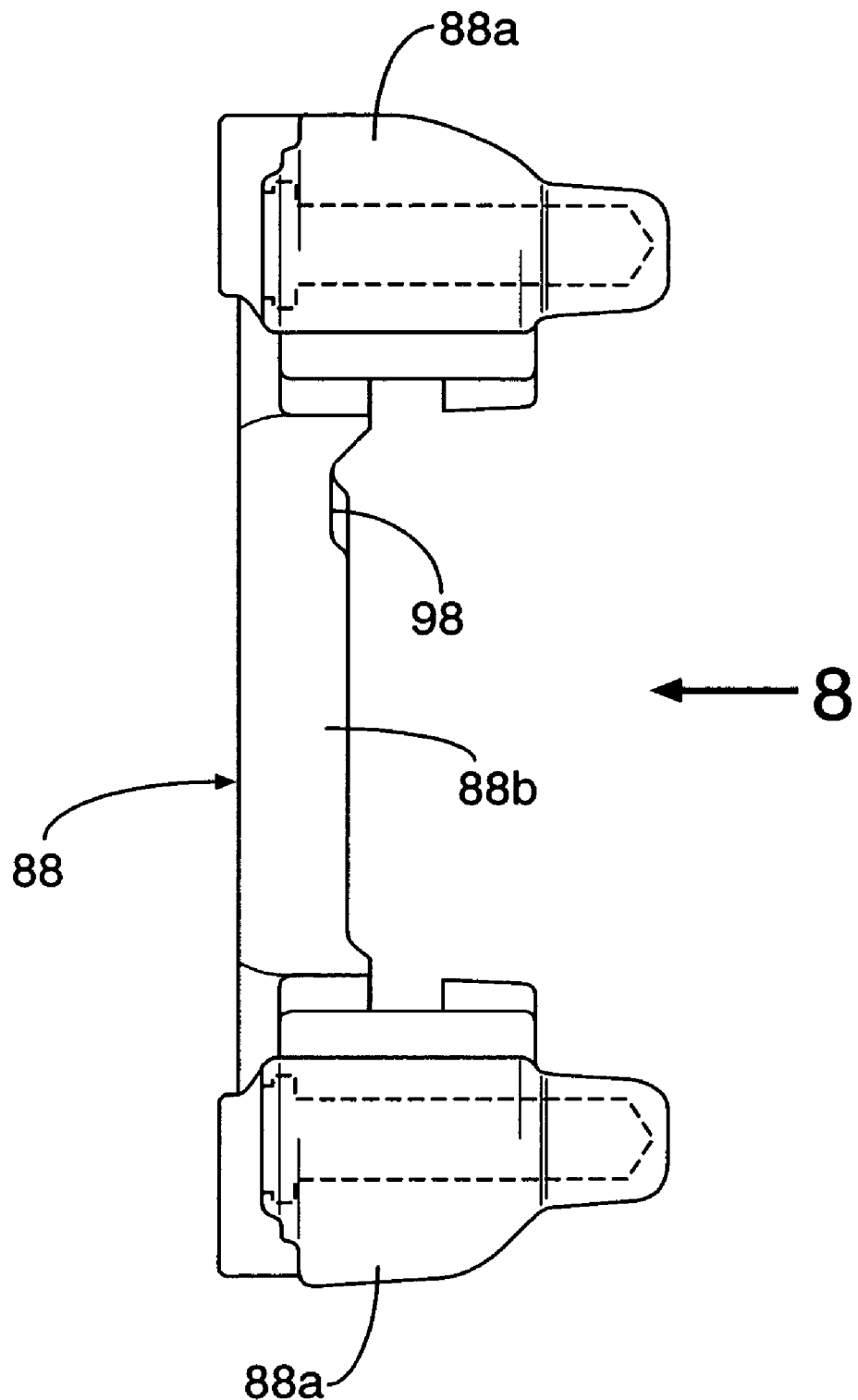
FIG. 7 is a view of a bracket taken in the same direction as FIG. 6.
Figure 8:
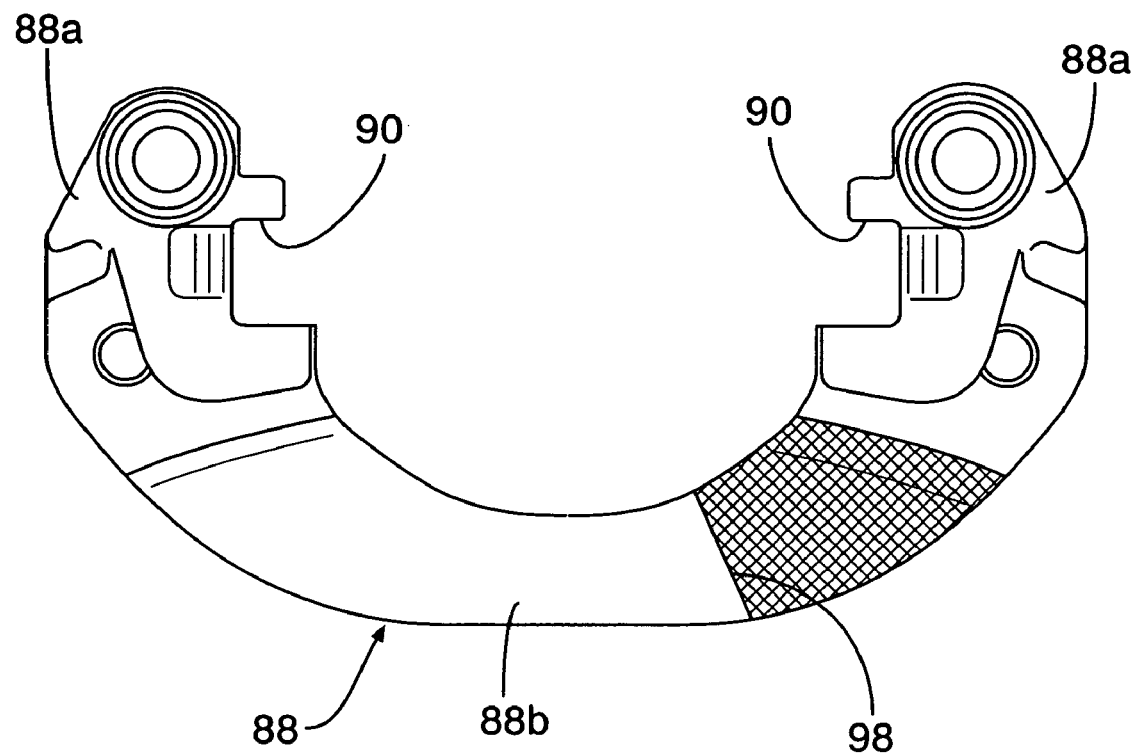
FIG. 8 is a view taken in the direction of arrow 8 of FIG. 7.

With reference to FIGS. 7 and 8 together, the bracket 88 integrally includes: a pair of support portions 88a and 88a spaced peripherally of the brake disk 84, and formed into a substantially U-shape so as to span an outer periphery of the brake disk 84; and a connecting portion 88b connecting the support portions 88a and 88a.

Back plates 89 and 89 of the pads 85 and 85 include shoulders 89a, 89a at opposite ends thereof along a periphery of the brake disk 84. The shoulders 89a and 89a are slidably fitted into guide grooves 90 and 90 provided in the support portions 88a and 88a of the bracket 88 via retainers 91 and 91.

The connecting portion 88b is disposed between the brake disk 84 and the swing arm 48, and mounted to the swing arm 48 with a pair of bolts 92 and 92 backward of the opening 81.

The caliper body 87 is constituted by an acting portion 87a and a reacting portion 87b placed on opposite sides of the brake disk 84, and a spanning portion 87c that spans the brake disk 84 and connects the acting portion 87a and the reacting portion 87b. The acting portion 87a is placed at the rear in the opening 81.

The acting portion 87a of the caliper body 87 is connected to the support portions 88a and 88a of the bracket 88 via a pair of slide pins 93 and 94 parallel to the rotational axis of the brake disk 84. The caliper body 87 is supported on the bracket 88 slidably in a direction parallel to the rotational axis of the brake disk 84.

A cylinder hole 95 opening on the side of the brake disk 84 is provided in the acting portion 87a. A brake piston 96 that can press one of the back plates 89 of the pads 85 against the brake disk 84 is slidably fitted into the cylinder hole 95. A press surface 97 that can evenly press the other of the back plates 89 of the pads 85 is formed on the reacting portion 87b.

In the above-described rear wheel disk brake 83, a recess 98 that allows an entire thickness of the pad 85 to be always visually identified from outside is provided in a portion covering from outside the pad 85 that is placed between the acting portion 87a of the caliper body 87 and the brake disk 84 in the bracket 88 constituting the caliper device 86. Further, the recess 98 is provided in a side surface facing the brake disk 84 of the connecting portion 88b of the bracket 88 so that the pad 85 can be visually identified together with part of the back plate 89.

The lower end of the rear cushion 64 provided between the swing arm 48 and the body frame F is connected to the swing arm 48 backward of the caliper device 86 in the rear wheel disk brake 83. The recess 98 is provided in the connecting portion 88b of the bracket 88 at a position where the caliper device 86 can be visually identified between the rear wheel WR and the rear cushion 64 when viewed diagonally from above the rear of the rear wheel as shown in FIG. 4. The recess 98 is formed so that the pad 85 can be visually identified within a range of an angle α of, for example, about 20 degrees upward and downward.

With reference to FIGS. 2 and 3 again, a drum brake 103 for a parking brake is fitted to a hub 102 of the rear wheel WR, a lever 104 for actuating the drum brake 103 to operate is placed outside the swing arm 48, and a rotational axis 105 to which a base end of the lever 104 is secured rotatably passes through the swing arm 48 to protrude into the drum brake 103. On the other hand, an end of an outer cable 107 included in a brake cable 106 is supported on a lower portion of the swing arm 48, and an end of an inner cable 108 protruding from the end of the outer cable 107 is connected to a tip of the lever 104.

Three support bosses 48a, 48b, and 48 care integrally provided on the swing arm 48 so as to protrude laterally outward. The exhaust muffler 78 fastened to the support bosses 48a to 48c with bolts 109 is placed laterally outside the swing arm 48 so as to laterally cover the caliper body 87 placed in the opening 81. The caliper body 87 is placed between the support bosses 48a and 48b among the support bosses 48a to 48c, and the support bosses 48a and 48b can protect the caliper body 87.

Next, operation of the embodiment will be described. The rear wheel disk brake 83 fitted to the rear wheel WR includes the caliper device 86 that supports the pads 85 and 85 that can be pressed against the brake disk 84 rotating with the rear wheel WR and exerts a force to press the pads 85 and 85 against the brake disk 84. The caliper device 86 is supported on the swing arm 48 that supports the axle 80 of the rear wheel WR. The recess 98 that allows the entire thickness of the pad 85 to be always visually identified from outside is provided in the portion of the bracket 88 that constitutes the caliper device 86, the portion covering one of the pads 85 and 85 from outside.

Thus, the entire thickness of the pad 85 can be always visually identified via the recess 98, thereby increasing a degree of freedom in positioning of the caliper device 86 and checking a remaining amount of the pad 85 in the rear wheel disk brake 83.

The swing arm 48 has the opening 81 in substantially the center thereof; is formed into the substantially triangular shape when laterally viewed; is placed on the right of the rear wheel WR so as to support the axle 80 of the rear wheel WR at the rear end thereof; and includes the caliper body 87 to which the brake piston 96 is slidably fitted and part of which is placed in the opening 81, and the bracket 88 formed by connecting the pair of support portions 88a and 88a that are spaced peripherally of the brake disk 84 and that support the pair of pads 85 and 85 via the connecting portion 88b placed between the brake disk 84 and the swing arm 48. The recess 98 is provided in the side surface facing the brake disk 84 of the connecting portion 88b.

The rear wheel disk brake 83 is configured as described above to prevent the caliper device 86 from protruding from a vehicle body. The recess 98 is provided in the connecting portion 88b placed between the swing arm 48 and the brake disk 84 in the bracket 88 that constitutes part of the caliper device 86, thereby eliminating the need for specific machining of the swing arm 48, allowing the remaining amount of the pad 85 to be checked using a small space, and reducing the cost and weight of the swing arm 48.

The lower end of the rear cushion 64 provided between the swing arm 48 swingably supported on the body frame F at the front end thereof and the body frame F, is connected to the swing arm 48 backward of the caliper device 86. The recess 98 is provided in the connecting portion 88b of the bracket 88 in the position where the caliper device 86 is visually identified between the rear wheel WR and the rear cushion 64 when viewed diagonally from above the rear of the rear wheel WR, thereby allowing the remaining amount of the pad 85 to be confirmed diagonally from above the rear of the rear wheel WR with a sufficient space to facilitate the check.

The embodiment of the invention has been described, but the invention is not limited to the embodiment, and various changes in design may be made without departing from the scope of claims of the invention.

For example, the case where the invention is applied to the rear wheel disk brake 83 of the scooter type vehicle has been described, but the invention is applicable to a motor cycle or a motor tricycle other than the scooter type vehicle.

Also, the invention can be implemented in connection with a front wheel disk brake.

What is claimed is:

1. A pad remaining amount checking structure in a disk brake of a vehicle in which a caliper device that supports pads that can be pressed against a brake disk rotating with a wheel and exerts a force to press the pads against the brake disk is supported on a support member that supports an axle of the wheel, wherein a recess that allows an entire thickness of a pad to always be visually identified from outside is provided in a portion of a member that constitutes the caliper device, the portion covering the pad from outside, wherein the support member is a swing arm having an opening in substantially a center thereof and is placed on one side of a rear wheel to support an axle of the rear wheel at a rear end thereof, wherein the caliper device includes a caliper body to which a brake piston is slidably fitted and part of which is placed in the opening, and a bracket formed by connecting a pair of support portions that are spaced peripherally of the brake disk and that support the pads via a connecting portion placed between the brake disk and the swing arm, and is supported on the swing arm, and wherein the recess is provided in a side surface facing the brake disk of the connecting portion.

2. The pad remaining amount checking structure in a disk brake of a vehicle according to claim 1, wherein a lower end of a rear cushion provided between the swing arm swingably supported on an engine provided on a body frame and the body frame is connected to the swing arm backward of the caliper device, and wherein the recess is provided in the connecting portion of the bracket in a position where the caliper device is visually identified between the rear wheel and the rear cushion when viewed diagonally from above the rear of the rear wheel.

* * * * *